United States Patent
Williamson

(10) Patent No.: US 8,589,344 B2
(45) Date of Patent: *Nov. 19, 2013

(54) SYSTEMS AND METHODS FOR GENERATING ITERATED DISTRIBUTIONS OF DATA IN A HIERARCHICAL DATABASE

(75) Inventor: Eric Williamson, Holly Springs, NC (US)

(73) Assignee: Red Hat, Inc., Raleigh, NC (US)

(*) Notice: Subject to any disclaimer, the term of this patent is extended or adjusted under 35 U.S.C. 154(b) by 294 days.

This patent is subject to a terminal disclaimer.

(21) Appl. No.: 12/627,225

(22) Filed: Nov. 30, 2009

(65) Prior Publication Data

US 2011/0131176 A1 Jun. 2, 2011

(51) Int. Cl.
G06F 7/00 (2006.01)
G06F 17/00 (2006.01)

(52) U.S. Cl.
USPC .......................................................... 707/625

(58) Field of Classification Search
None
See application file for complete search history.

(56) References Cited

U.S. PATENT DOCUMENTS

| | | | |
|---|---|---|---|
| 5,701,137 A | 12/1997 | Kiernan et al. | |
| 5,878,415 A | 3/1999 | Olds | |
| 5,890,167 A | 3/1999 | Bridge, Jr. et al. | |
| 5,978,796 A | 11/1999 | Malloy et al. | |
| 6,360,188 B1 | 3/2002 | Freidman et al. | |
| 6,366,922 B1 | 4/2002 | Althoff | |
| 6,415,283 B1 * | 7/2002 | Conklin | 1/1 |
| 6,434,435 B1 | 8/2002 | Tubel et al. | |
| 6,434,544 B1 | 8/2002 | Bakalash et al. | |
| 6,594,672 B1 | 7/2003 | Lampson et al. | |
| 6,609,123 B1 | 8/2003 | Cazemier et al. | |
| 6,735,590 B1 | 5/2004 | Shoup et al. | |
| 6,735,690 B1 | 5/2004 | Barry et al. | |
| 6,897,885 B1 | 5/2005 | Hao et al. | |
| 6,931,418 B1 | 8/2005 | Barnes | |
| 7,152,062 B1 | 12/2006 | Draper et al. | |
| 7,299,241 B2 | 11/2007 | Reed et al. | |
| 7,660,822 B1 | 2/2010 | Pfleger | |
| 7,809,759 B1 | 10/2010 | Bruso et al. | |
| 8,396,880 B2 | 3/2013 | Williamson | |
| 2001/0049678 A1 | 12/2001 | Yaginuma | |

(Continued)

OTHER PUBLICATIONS

Parasuraman et al, A Model for Types and Levels of Human Interaction with Automation May 30, 2000, IEEE, IEEE Transactions on Systems, Mayn, and Cybernetics—Part A: Systems and Humans, vol. 30 No. 3., 286-297.*

(Continued)

*Primary Examiner* — Jason Liao
(74) *Attorney, Agent, or Firm* — Lowenstein Sandler LLP

(57) ABSTRACT

Embodiments relate to systems and methods for generating iterated distributions of data in a hierarchical database. A data store can store data in a hierarchical format, for instance, in a tree. Higher-level data, such as yearly profit, may be desired to be spread from parent nodes to lower nodes, such as nodes representing quarters. A spreading tool can insert child nodes representing quarters, months, or other at insertion point(s) represented or encoded by a set of placeholder nodes, dividing quantities appropriately. In aspects, the spreading tool can access or host sequence logic including multiple sets of spreading rules which each ensure that data is spread in an order that takes dependencies, formatting, outputs, or other factors into account. In aspects, the spreading tool can receive or generate a prioritized ordering of the sets of spreading rules, to ensure that data distribution passes are iterated in a desired or error-free order.

15 Claims, 6 Drawing Sheets

(56) References Cited

U.S. PATENT DOCUMENTS

| | | |
|---|---|---|
| 2002/0029207 A1 | 3/2002 | Bakalash et al. |
| 2002/0035562 A1 | 3/2002 | Roller et al. |
| 2002/0083034 A1 | 6/2002 | Orbanes et al. |
| 2002/0087516 A1 | 7/2002 | Cras et al. |
| 2002/0169658 A1 | 11/2002 | Adler |
| 2003/0085997 A1 | 5/2003 | Takagi et al. |
| 2003/0093755 A1 | 5/2003 | O'Carroll |
| 2003/0114950 A1 | 6/2003 | Ruth et al. |
| 2003/0115194 A1 | 6/2003 | Pitts et al. |
| 2003/0115207 A1 | 6/2003 | Bowman et al. |
| 2003/0120372 A1 | 6/2003 | Ruth et al. |
| 2003/0126114 A1 | 7/2003 | Tedesco |
| 2003/0184585 A1 | 10/2003 | Lin et al. |
| 2003/0225736 A1 | 12/2003 | Bakalash et al. |
| 2004/0039736 A1 | 2/2004 | Kilmer et al. |
| 2004/0133552 A1 | 7/2004 | Greenfield et al. |
| 2004/0139061 A1 | 7/2004 | Colossi et al. |
| 2005/0004904 A1 | 1/2005 | Kearney et al. |
| 2005/0010566 A1 | 1/2005 | Cushing et al. |
| 2005/0028091 A1* | 2/2005 | Bordawekar et al. ......... 715/514 |
| 2005/0060382 A1 | 3/2005 | Spector et al. |
| 2005/0132070 A1 | 6/2005 | Redlich et al. |
| 2006/0004833 A1 | 1/2006 | Trivedi et al. |
| 2006/0036707 A1 | 2/2006 | Singh et al. |
| 2006/0122996 A1 | 6/2006 | Bailey |
| 2006/0136462 A1 | 6/2006 | Campos et al. |
| 2006/0262145 A1 | 11/2006 | Zhang et al. |
| 2007/0022093 A1 | 1/2007 | Wyatt et al. |
| 2007/0027904 A1 | 2/2007 | Chow et al. |
| 2007/0088757 A1 | 4/2007 | Mullins et al. |
| 2007/0094236 A1 | 4/2007 | Otter et al. |
| 2007/0208721 A1 | 9/2007 | Zaman et al. |
| 2008/0140696 A1 | 6/2008 | Mathuria |
| 2008/0172405 A1 | 7/2008 | Feng et al. |
| 2008/0243778 A1 | 10/2008 | Behnen et al. |
| 2008/0294596 A1 | 11/2008 | Xiong |
| 2008/0320023 A1 | 12/2008 | Fong |
| 2009/0100086 A1 | 4/2009 | Dumant et al. |
| 2009/0144319 A1 | 6/2009 | Panwar et al. |
| 2009/0193039 A1 | 7/2009 | Bradley et al. |
| 2009/0199086 A1* | 8/2009 | Wake ........................... 715/235 |
| 2009/0222470 A1 | 9/2009 | Kemp et al. |
| 2009/0254572 A1 | 10/2009 | Redlich et al. |
| 2009/0319546 A1 | 12/2009 | Shaik |
| 2010/0057700 A1 | 3/2010 | Williamson |
| 2010/0057777 A1 | 3/2010 | Williamson |
| 2010/0131456 A1 | 5/2010 | Williamson |
| 2010/0169299 A1 | 7/2010 | Pollara |
| 2010/0305922 A1 | 12/2010 | Williamson |
| 2010/0306254 A1 | 12/2010 | Williamson |
| 2010/0306255 A1 | 12/2010 | Williamson |
| 2010/0306272 A1 | 12/2010 | Williamson |
| 2010/0306281 A1 | 12/2010 | Williamson |
| 2010/0306340 A1 | 12/2010 | Williamson |
| 2010/0306682 A1 | 12/2010 | Williamson |
| 2011/0050728 A1 | 3/2011 | Williamson |
| 2011/0054854 A1 | 3/2011 | Williamson |
| 2011/0055680 A1 | 3/2011 | Williamson |
| 2011/0055761 A1 | 3/2011 | Williamson |
| 2011/0055850 A1 | 3/2011 | Williamson |
| 2011/0078199 A1 | 3/2011 | Williamson |
| 2011/0078200 A1 | 3/2011 | Williamson |
| 2011/0131176 A1 | 6/2011 | Williamson |
| 2011/0131220 A1 | 6/2011 | Williamson |
| 2011/0158106 A1 | 6/2011 | Williamson |
| 2011/0161282 A1 | 6/2011 | Williamson |
| 2011/0161374 A1 | 6/2011 | Williamson |
| 2011/0161378 A1 | 6/2011 | Williamson |
| 2012/0054131 A1 | 3/2012 | Williamson |
| 2012/0054212 A1 | 3/2012 | Williamson |
| 2012/0130979 A1 | 5/2012 | Williamson |
| 2012/0131014 A1 | 5/2012 | Williamson |
| 2012/0136824 A1 | 5/2012 | Williamson |
| 2012/0136879 A1 | 5/2012 | Williamson |
| 2012/0136880 A1 | 5/2012 | Williamson |
| 2012/0136903 A1 | 5/2012 | Williamson |

OTHER PUBLICATIONS

Howe, Iteration Apr. 4, 1998, Foldoc.org, http://foldoc.org/iteration.*

Lane et al, Oracle Database Data Warehousing Guide 10g Release 2 (10.2) Dec. 2005, Oracle Corporation, all.*

Alison et al., Oracle Warehouse Builder Users Guide 10g Release 1 (10.1) Sep. 2007, Oracle Corporation, all.*

Oracle Database Online Documentation 10g Release 2 10.2 date various, Oracle Corporation, all.*

Oracle Warehouse Documentation 10g Release 1, date various, Oracle Corporation, all.*

Oracle row count for all tables in schema Apr. 28, 2009, Burlseson Consulting, http://www.dba-oracle.com/t_count_rows_all_tables_in_schema.htm.*

Williamson, "Systems and Methods for Generating an Optimized Output Range for a Data Distribution in a Hierarchical Database", U.S. Appl. No. 12/627,256, filed Nov. 30, 2009.

Williamson, "Systems and Methods for Distribution of Data in a Hierarchical Database via Placeholder Nodes", U.S. Appl. No. 12/570,704, filed Sep. 30, 2009.

Williamson, "Systems and Methods for Conditioning the Distribution of Data in a Hierarchical Database", U.S. Appl. No. 12/571,009, filed Sep. 30, 2009.

Using OLAP and Multi-Dimensional data for decision nicking, Hasan at al. IEEE 2001.

A new OLAP aggregation bases on the AHC technique, Massaoud et al, DOLAP'04 Nov. 12-13, 2004.

Interactive hierarchical dimension ordering, spacing and filtering for exploration of high dimension datasets, Yang et al, IEEE symposium on information visualization 2003.

Williamson, "Systems and Methods for Interpolating Conformal Input Sets Based on a Target , Output", U.S. Appl. No. 12/872,779, filed Aug. 31, 2010.

Williamson, "Systems and Methods for Interpolating Alternative Input Sets Based on User-Weighted Variables", U.S. Appl. No. 12/951,881, filed Nov. 22, 2010.

Wiiliamson, "Systems and Methods for Tracking Differential Changes in Conformal Data Input Sets", U.S. Appl. No. 12/951,937, filed Nov. 22, 2010.

Williamson, "Systems and Methods for Training a Self-Learning Network Using Interpolated Input Sets Based on a Target Output", U.S. Appl. No. 12/872,935, filed Aug. 31, 2010.

Williamson, "Systems and Methods for Embedding Interpolated Data Object in Application Data File", U.S. Appl. No. 12/955,717, filed Nov. 29, 2010.

Williamson, "Systems and Methods for Generating Interpolated Input Data Sets Using Reduced Input Source Objects", U.S. Appl. No. 12/955,768, filed Nov. 29, 2010.

Williamson, "Systems and Methods for Filtering Interpolated Input Data Based on User-Supplied or Other Approximation Constraints", U.S. Appl. No. 12/955,790, filed Nov. 29, 2010.

Williamson, "Systems and Methods for Binding Multiple Interpolated Data Objects", U.S. Appl. No. 12/955,811, filed Nov. 29, 2010.

WilNamson, "Systems and Methods for Generating Portable Interpolated Data Using Object Based Encodig of Interpolated Results", U.S. Appl. No. 13/037,322, filed Feb. 28, 2011.

ASPFAQ.com, "What are the valid styles for converting datetime to string?", (2006) http://database.aspfaq.com/database/what-are-the-valid-styles-for-convening-datetime-to-string.html.

Using OLAP and Multi-Dimensional data for decision making, Hasan et al., IEEE 2001.

A new OLAP aggregation based on the AHC technique, Massaoud et al., DOLAP'04, Nov. 12-13, 2004.

Interactive hierarchical dimension ordering, spacing and filtering for exploration of high dimension datasets, Yang et al., IEEE symposium on information visualization 2003.

(56) References Cited

OTHER PUBLICATIONS

ASPFAQ.com, "What are the valid styles for converting datetime to string?", (2006) http://database.aspfaq.com/database/what-are-the-valid-styles-for-converting-datetime-to-string.html.

Answering Joint Queries from Multiple Aggregate OLAP Databases, Pourabbas et al, LNCS 2737, pp. 24-34, 2003.

Williamson, "Systems and Methods for Generating Portable Interpolated Data Using Object-Based Encoding of Interpolated Results", U.S. Appl. No. 13/037,322, filed Feb. 28, 2011.

Williamson, "Systems and Methods for Generating Interpolation Data Template to Normalize Analytic Runs", U.S. Appl. No. 13/037,332, filed Feb. 28, 2011.

Williamson, "Systems and Methods for Generating Interpolation Data Sets Converging to Optimized Results Using Iterative Overlapping Inputs", U.S. Appl. No. 13/037,341, filed Feb. 28, 2011.

Williamson, "Systems and Methods for Validating Interpolation Results Using Monte Carlo Simulations on Interpolated Data Inputs", U.S. Appl. No. 13/037,344, filed Feb. 28, 2011.

Fausett, Fundamentals of Neural Networks: Architectures, Algorithms, and Applications, 1994, 1st Ed, Table of Contents.

Fogel, Oracle Database Administrators Guide May 2006, Oracle, 10g Release 2, all.

Google Search Results for keywords neural network rule production, Feb. 22, 2012, Google.com, http://google.com.

Hoffman, Karla, Combinatorial optimization: Current successes and directions for the future, Jan. 31, 2000, Journal of Computational and Applied Mathematics 124 (2000), 341-360.

Li et al., Research of Image Affective Semantic Rules Based on Neural Network, 2008, 2008 International Seminar on Future BioMedical Information Engineering, 148-151.

Rule, Define Rule at Dictionary.com, accessed Feb. 12, 2012, dictionary.com, http://dictionary.reference.com/browse/rule.

Wood et al., Document Object Model (DOM) Level 1 Specification, Oct. 1998, Version 1, http://www.w3org.TR/RCE-DOM-Level_1/level-one-core.html#ID-1CED5498.

Office Action for U.S. Appl. No. 12/571,009, mailed Sep. 12, 2011.
Office Action for U.S. Appl. No. 12/571,009, mailed Feb. 10, 2012.
Advisory Action for U.S. Appl. No. 12/571,009 mailed Apr. 17, 2012.
Office Action for U.S. Appl. No. 12/570,704, mailed Sep. 15, 2011.
Advisory Action for U.S. Appl. No. 12/570,704 mailed Apr. 23, 2012.
Office Action for U.S. Appl. No. 12/570,704, mailed Feb. 1, 2012.
Office Action for U.S. Appl. No. 12/570,704, mailed Jul. 19, 2012.
Advisory Action for U.S. Appl. No. 12/627,256 mailed May 1, 2012.
Office Action for U.S. Appl. No. 12/627,256, mailed Nov. 15, 2011.
Office Action for U.S. Appl. No. 12/627,256, mailed Feb. 23, 2012.
Office Action for U.S. Appl. No. 12/627,256, mailed Jun. 5, 2012.
Notice of Allowance for U.S. Appl. No. 12/627,256, mailed Dec. 13, 2012.
Office Action for U.S. Appl. No. 12/570,704, mailed Apr. 24, 2013.

* cited by examiner

SYSTEMS AND METHODS FOR GENERATING ITERATED DISTRIBUTIONS OF DATA IN A HIERARCHICAL DATABASE

CROSS REFERENCE TO RELATED APPLICATIONS

The subject matter of this application is related to the subject matter of co-pending U.S. application Ser. No. 12/570,704, filed Sep. 30, 2009, entitled "Systems and Methods for Distribution of Data in a Hierarchical Database via Placeholder Nodes", by the same inventor as this application, and being assigned or under assignment to the same entity as this application, and to the subject matter of co-pending U.S. application Ser. No. 12/571,009; filed Sep. 30, 2009, entitled "Systems and Methods for Conditioning the Distribution of Data in a Hierarchical Database", by the same inventor as this application, and being assigned or under assignment to the same entity as this application, each of which applications are incorporated herein in their entirety.

FIELD

The present teachings relate to systems and methods for generating iterated distributions of data in a hierarchical database, and more particularly to systems and techniques for distributing data from parent nodes to a set of child nodes in spreading or other operations, in which multiple sets of spreading rules can be invoked or applied for the iterated distribution of data from parent nodes to sets of child nodes.

BACKGROUND OF RELATED ART

In networked database technologies, hierarchical databases such as online analytical processing (OLAP) databases, extensible markup language (XML)-based data stores, and others are known. During operations with hierarchical data stores, it is sometimes necessary or desirable to add or insert additional data values into nodes which lie beneath the parent node in the hierarchy. For instance, if a parent node stores financial data reflecting annual profit for a corporation or other entity, it may be desired at the same time or a later time to insert lower-level breakdowns of that data over smaller intervals. For example, it may be desired to insert child nodes which store quarterly or monthly profit for that entity. In general, the process of pushing or distributing data down to child nodes or other destinations in the database structure can be referred to as "spreading" the data.

In known database platforms, the ability to perform spreading operations can be constrained or limited by limitations in the data structures and logical operations permitted on those platforms. For one, while platforms may exist which permit a user to insert a new child node at a lower level in relation to a parent node, data may only be distributed down from one parent at a time. If, for instance, annual profit is intended to be expanded or spread down to quarterly profit entries over the last ten years or some other group of years, the user may be forced to manually insert the child nodes and manually perform the spreading, year by year.

For another, when performing distribution of data between nodes or levels in a hierarchical data store, the order in which spreading is performed can have effects which the database engine does not take into account. For instance, when spreading annual profit down to quarterly nodes, it may be necessary to check for special charge offs or other factors against profit in a given quarter, or profit for a first fiscal quarter may be affected by a carry-over entry from the previous fiscal year end. Other factors or dependencies can apply, but existing database platforms do not permit the incorporation of dependency rules or other logic to ensure data accuracy or integrity.

Yet further, existing platforms do not permit the management of multiple different sets of spreading rules, in which a sequence or ordering of the various rule sets must be established before generating multiple iterations of data distribution down to lower level nodes, or other destinations. Other shortcomings in existing database engines exist. It may be desirable to provide systems and methods for generating iterated distributions of data in a hierarchical database which permit the distribution of data from parent nodes to child nodes over multiple iterations, and which permit the selection or ordering of the rule sets to be applied.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
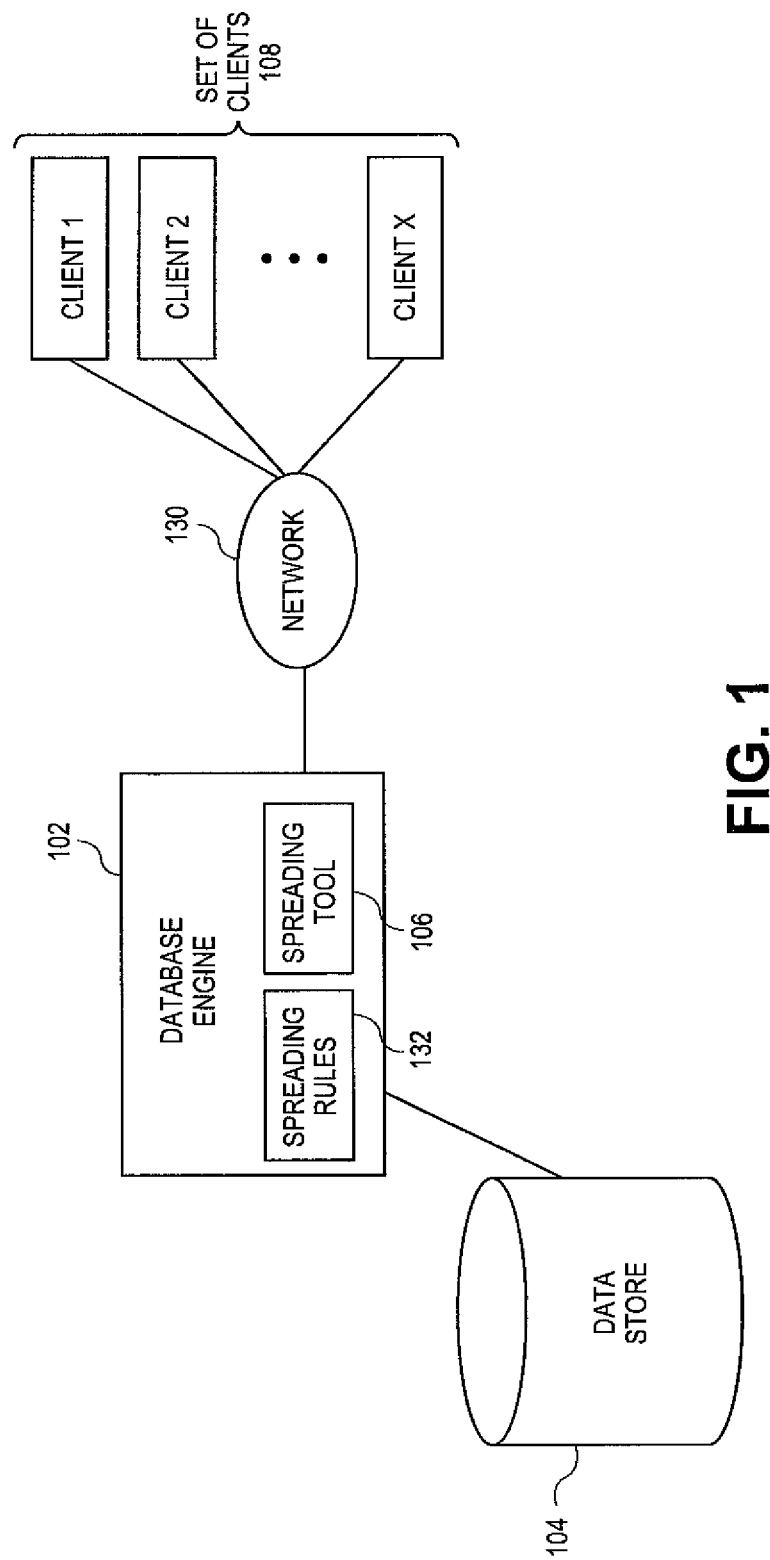
FIG. 1 illustrates an overall system in which systems and methods for generating iterated distributions of data in a hierarchical database can be implemented, according to various embodiments.

Embodiments of the present teachings relate to systems and methods for generating iterated distributions of data in a hierarchical database. More particularly, embodiments relate to platforms and techniques for accessing a set of hierarchical data, such as data stored in OLAP, XML, or other data sources, and manipulating that data for distribution or spreading to lower hierarchical levels. In embodiments, a set of placeholder nodes can be associated with a set of parent nodes, to act as points for insertion for child nodes or other lower level structures, at a current or later time. In embodiments, the placeholder nodes can store linkages to one or more parent nodes, and in embodiments can be invisible to users of the associated database engine until viewing or spreading operations are desired. In embodiments, the set of placeholder nodes can also further represent programmatically manipulable objects, which, for instance, encode inheritance rules, output pipes, or other linkages, or other logic or functions for the subsequent child nodes inserted in their place or at their location. In embodiments, the set of placeholder nodes can be generated, configured, and managed by a spreading tool of an associated database engine which manages the overall hierarchical data store.

When the spreading of data to child nodes or levels is desired, a user can access the spreading tool and view and manipulate the set of placeholder nodes to insert one or more sets of child nodes configured to receive data from, or data derived from, the corresponding parent node. In embodiments, the spreading tool and/or other logic can access the set of placeholder nodes involved in distribution activity, and use those nodes as insertion points to populate the hierarchical data store with new, additional, and/or updated child nodes to receive data. In embodiments, identical, and/or or related placeholder nodes can be associated with more than one parent node, so that, among other things, a set of child nodes and subsequent distribution of data can be performed from multiple parent nodes at the same time. In embodiments, the spreading tool can delete the set of placeholder nodes when a spreading operation or other distribution has been completed. In embodiments, the spreading tool can in addition or instead retain any placeholder nodes used in a distribution of data to child nodes, for instance to maintain a record of the distribution activity.

In embodiments, the spreading tool can access and apply a set of spreading rules and/or other logic to ensure data integrity or accuracy in view of potential data dependencies, data formatting requirements, and/or other factors affecting the distribution or computation of data stored in or related to the hierarchical database. In embodiments, the set of spreading rules can comprise a plurality of sets of spreading rules. For instance, one set of spreading rules can pertain to or govern currency conversions on stored financial data, when conversions are called for, while another set of spreading rules can pertain to or govern tax treatments or adjustments on the same type of data. Other types of rules can be used. In embodiments, the multiple sets of spreading rules can be independent or separate. In embodiments, the multiple sets of spreading rules can be associated or related. In embodiments, the multiple sets of spreading rules can overlap. According to various embodiments, in general the spreading tool can apply prioritization logic to select the rule sets among the plurality of sets of spreading rules which will be applied to various iterations of data distribution in the hierarchical database or other data store. In aspects, some or all of the rule sets in the plurality of sets of spreading rules can be used in one or more pass or iteration of data distribution. According to various embodiments, in general the spreading tool can apply prioritization logic to generate an order, list, and/or sequence of the selected rule sets from the plurality of sets of spreading to use in various iterations of data distribution in the hierarchical database or other data store. In aspects, that order may be received from a user, and/or generated automatically using the prioritization logic, and/or other tools or resources. The ordering of the multiple passes or iterations can be configured, for instance, to ensure error-free outputs, consistency in data, and/or other conditions or criteria.

Reference will now be made in detail to exemplary embodiments of the present teachings, which are illustrated in the accompanying drawings. Where possible the same reference numbers will be used throughout the drawings to refer to the same or like parts.

FIG. 1 illustrates an overall system 100 in which systems and methods for generating iterated distributions of data in a hierarchical database can operate, according to various embodiments. A set of clients 108 can communicate with a database engine 102 via one or more network 130. database engine 102 can be or include storage, hardware, software, and/or other resources to execute database operations, such as accessing and manipulating OLAP data stores, XML data stores, other database stores, engines, or applications, statistical applications, spreadsheet applications, or other services or applications, database engine 102 can communicate with and manage a hierarchical data store 104, such as an OLAP database, an XML-based database, and/or other data store. Set of clients 108 can be or include, for example, a set of local or remote desktop computers, laptop computers, wireless devices, and/or other machines or devices which communicate with one or more network 130 can be or include, for example, the Internet or other public or private networks. database engine 102 can be or include a server with associated memory, storage, and other resources configured to receive database requests from one or more clients in set of clients 108, and interpret that request to perform database operations on data maintained in data store 104.

As likewise shown in FIG. 1, a user of a client in set of clients 108 can invoke or instantiate spreading tool 106 of database engine 102 via a local application or interface, such as a Web browser, database application, or other software. Spreading tool 106 can, in general, contain logic, storage, and/or other resources to effectuate the distribution, transfer, copying, or other communication of data from parent or other upper-level nodes in data store 104 to child nodes or other destinations via a set of placeholder nodes. In aspects, the set of placeholder nodes can as placeholders, and can be stored in reserve storage and/or memory locations which can act as insertion points for new or modified child nodes for levels of data that a user may later choose to insert. In embodiments, each placeholder node 114 can act not merely or only as a temporary, shadow, or otherwise passive storage location or object, but as a programmatically configurable object which is capable of establishing inheritance and other properties for the set of child nodes derived from that placeholder. In embodiments, during the distribution of data to any inserted child nodes, spreading tool 120 can access a set of spreading rules 132 to ensure that functional or other dependencies, data formatting, and other data integrity requirements are met.

Figure 2:
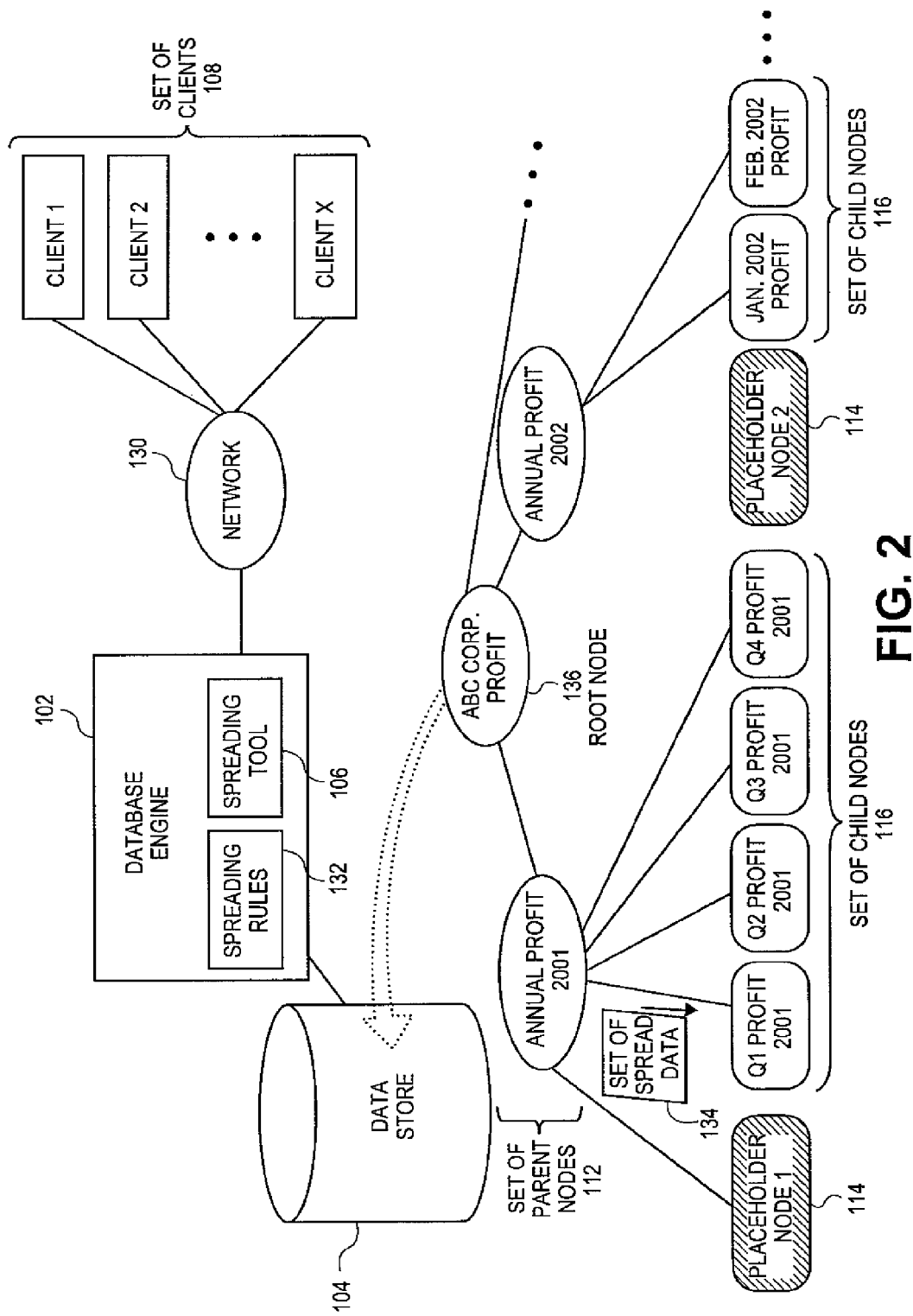
FIG. 2 illustrates an illustrative distribution of data from one or more parent levels to one or more child levels in a hierarchical data store, according to various embodiments.

More particularly, as shown, for example, in FIG. 2, the hierarchical data store 104 can comprise hierarchical data structures including, for instance, a set of parent nodes 112. Set of parent nodes 112 can be linked to a root node 136, illustratively shown as profit for a corporation, although it will be understood that any other data type, category, or format can be used. Set of parent nodes 112 are illustratively shown as encoding a set of annual profit data arranged in parent nodes each representing one year, although, again, other data types and configurations can be used. In aspects, data other than financial data, such as, for example, medical, technical, scientific, and/or other data can be processed according to embodiments of the present teachings.

In embodiments as shown, the set of parent nodes 112 can have an associated set of placeholder nodes 114 linked to them. In embodiments, each parent node in set of parent nodes 112 can have one or more placeholder nodes associated with it. In embodiments, only a subset of set of parent nodes 112 can have an associated set of placeholder nodes 114 established or linked to them. In embodiments, each of the placeholder nodes can constitute a "leaf" node, that is, a node not having any further child nodes. In embodiments, each placeholder node in set of placeholder nodes 114 can occupy a lower level in data store than 104 than its associated parent node, although in aspects the set of placeholder nodes 114 need not all occupy the same level of data store 104. In embodiments, set of placeholder nodes 114 can define data fields and formats that can be used to populate a set of child nodes 116 that will be inserted into data store 104.

In embodiments, when a user of set of clients 108 or other user wishes to access data store 104 and insert new or updated child nodes in that data structure, the user can access spreading tool 106 via network 130. The user can use spreading tool 106 to locate one or more placeholder nodes in set of placeholder nodes 114 via which the user wishes to add one or more set of child nodes 116. In aspects, a user may for instance access a placeholder node in set of placeholder nodes 114 associated with an annual profit node for the year 2001 in set of parent nodes 112. The user can insert, for instance, set of four child nodes representing quarterly profit derived from the annual profit parent node for that year. According to embodiments, the user can direct spreading tool 106 to initiate the spreading or distribution of annual profit data down to the lower-level set of child nodes 116.

Spreading tool 106 can perform the distribution by dividing the annual profit data encoded in the associated parent node (e.g. year 2001 profit as shown) equally into four quarters, and transmitting the resulting set of spread data 134 to each of the set of child nodes 116 associated with that parent node. In embodiments, the set of spread data 134 need not be equally divided over all child nodes associated with the parent node. In embodiments, the same or different set of spread data 134 can be generated and distributed from more than one parent in set of parent nodes 112 at the same time, or as part of the same operation. Other types of child nodes, levels, and formats of set of spread data 134 can be used, including, for instance, monthly profit nodes, as likewise shown in FIG. 2. Other structures, layers, and relationships between levels of information stored in data store 104 can be used.

In embodiments, in addition to defined data structures, each node in set of placeholder nodes 114 can encode or represent a set of specifications for inheritance by set of child nodes 116, or other programmatic information for determining the configuration of set of child nodes 116 or any aspect of their operation. In embodiments, set of placeholder nodes 114 can serve as passive data-structure objects, acting as a reserve storage or insertion point, a database flag, a database event trigger. In embodiments, increased flexibility in data spreading operations can be enhanced by establishing and utilizing set of placeholder nodes with a set of attributes and/or metadata to allow those nodes to operate as programmatic objects in themselves. For instance, in embodiments, set of placeholder nodes 114 can be configured as an event or function that triggers a rule, and can for example form part of the object inheritance from one or more parent nodes, themselves. For example, set of placeholder nodes 114 can be configured to force set of spread data 134 to conform to U.S. dollar figures or format, and for instance to perform currency conversions to that denomination automatically. For further example, set of placeholder nodes 114 can store linkages, interfaces, mappings, and/or relationships to other nodes that will require outputs from the set of child nodes 116, once those nodes are installed and populated with data. Other programmatic settings can be configured in set of placeholder nodes 114. In embodiments, the programmatic settings stored in or associated with set of child nodes 114 can be updated or extended at any time.

It may be noted that in embodiments, spreading tool 106 can condition or process the set of spread data 134 transmitted to one or more child nodes before sending that information, to ensure data integrity or consistency. In embodiments, spreading tool 106 can invoke or access set of spreading rules 132 and/or other logic to ensure that data spread from set of parent nodes 112 is distributed to child nodes in a correct or consistent order. In embodiments, set of spreading rules 132 can specify that certain child nodes whose data or output is needed by other nodes are the first to receive set of spread data 134. In embodiments, set of spreading rules 132 can specify that set of spread data 134 be encoded in or converted to formats required by recipient nodes or other destinations. In embodiments, set of spreading rules 132 can enforce or apply other logic or rules to ensure that set of spread data 134 is transmitted, formatted, computed, or otherwise manipulated to preserve the consistency or integrity of set of spread data 134 and/or any calculations, outputs, and/or services that use or depend on that data. It may be noted that in embodiments, the same or different spreading rules in set of spreading rules 132 can be applied to distributions from two or more parent nodes, in cases where a distribution is carried out from more than one parent node at a time.

Figure 3:
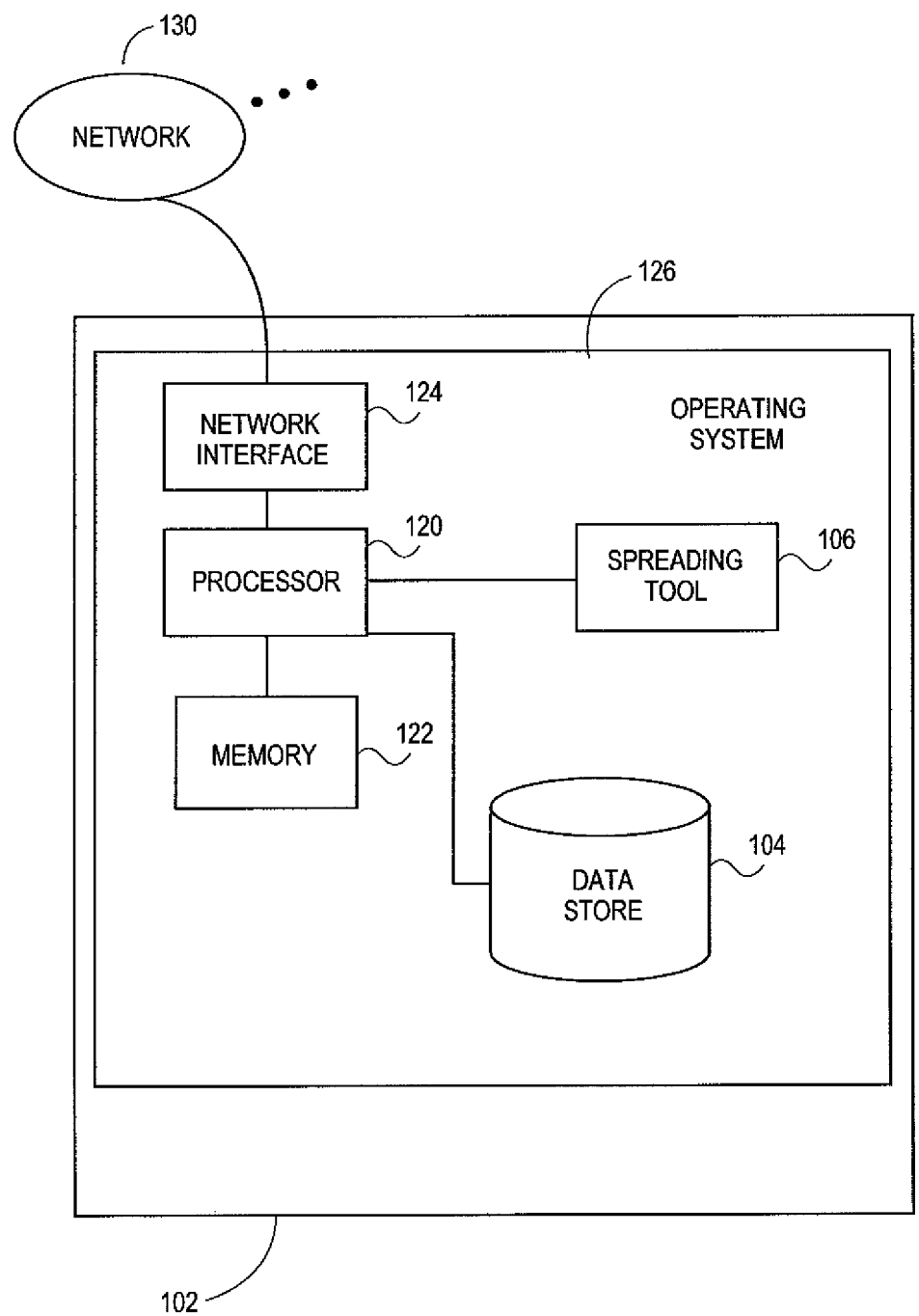
FIG. 3 illustrates an illustrative hardware configuration of hardware that can implement a database engine, consistent with various embodiments of the present teachings.

FIG. 3 illustrates an exemplary configuration of database engine 102 which can be used in systems and methods for generating iterated distributions of data in a hierarchical database, according to embodiments. In embodiments as shown, database engine 102 can comprise a processor 120 communicating with memory 122, such as electronic random access memory, operating under control of or in conjunction with operating system 126. Operating system 126 can be, for example, a distribution of the Linux™ operating system, the Unix™ operating system, or other open-source or proprietary operating system or platform. Processor 120 also communicates with data store 104, such as a local or remote database, which can be stored, for instance, on one or more hard drives, optical drives, magnetic drives, electronic memory, and/or other storage. Processor 120 further communicates with network interface 124, such as an Ethernet or wireless data connection, which in turn communicates with one or more network 130, such as the Internet or other public or private networks. Processor 120 can, for example, communicate with set of clients 108 via one or more network 130. Processor 120 also communicates with database engine 102, spreading tool 106, and/or and other resources to control the processing of hierarchical data including transfer of data between set of parent nodes 112, set of placeholder nodes 114, set of child nodes 116, and/or other nodes, entries, fields, and/or locations. Other configurations of database engine 102, associated network connections, and other hardware and software resources are possible.

Figure 4:
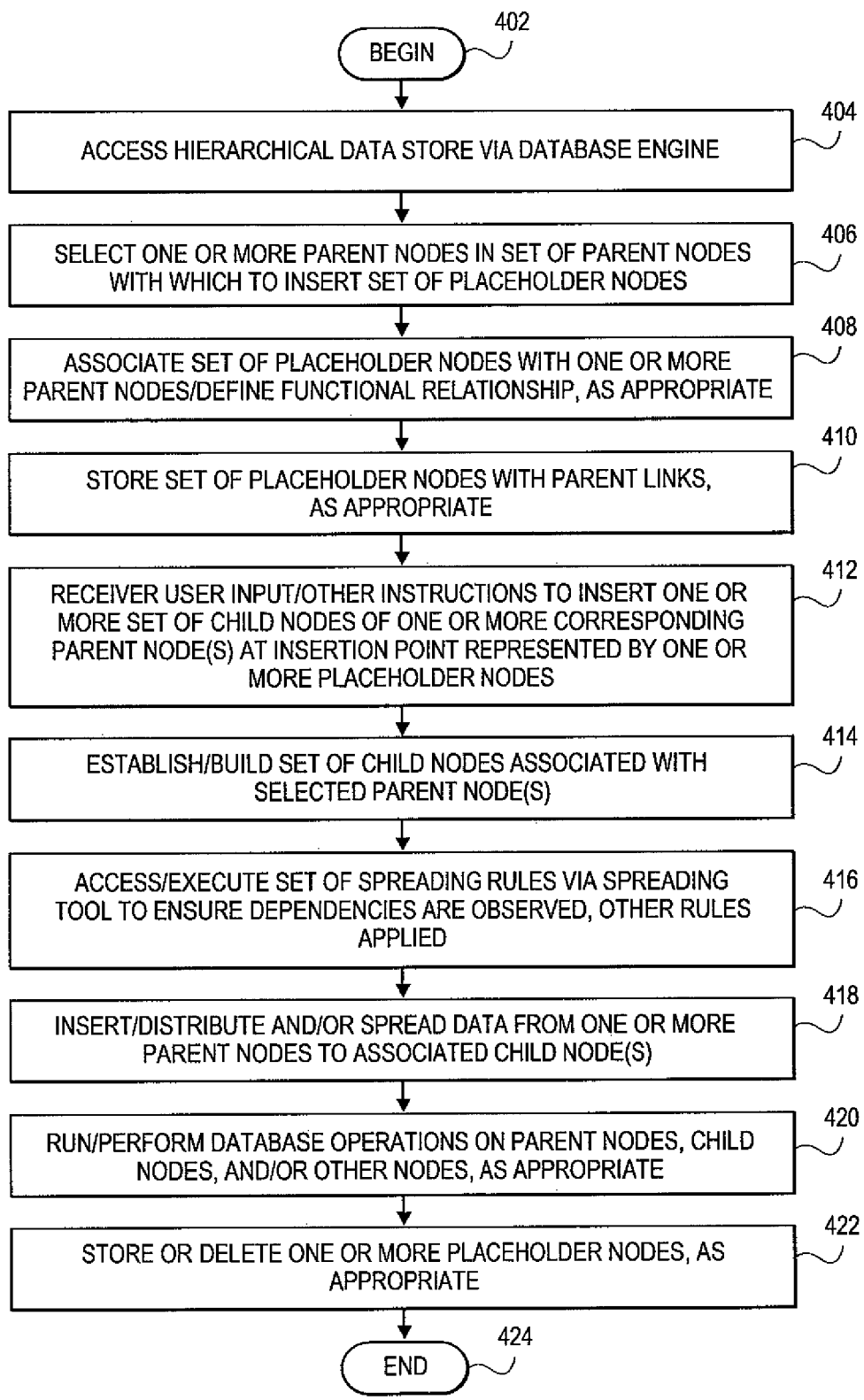
FIG. 4 illustrates overall data aggregation processing to generate distributions of data to lower hierarchical levels via placeholder nodes, according to various embodiments.

FIG. 4 illustrates a flowchart of data processing operations that can be used in systems and methods for generating iterated distributions of data in a hierarchical database, according to various embodiments. In 402, processing can begin. In 404, a hierarchical data store 104 can be accessed via database engine 102, for instance, by request from a client in set of clients 108, or other request. In 406, one or more parent nodes in set of parent nodes 110 can be selected with which or in which to insert a set of placeholder nodes 114. In 408, set of placeholder nodes 114 can be associated with one or more parent nodes in set of parent nodes 110, for instance, by selection or input by a user. In embodiments, a functional relationship between the one or more parent nodes and set of placeholder nodes 114 can be defined, such as, for example, to define set of placeholder nodes 114 to contain or represent a division of annual profit stored in the associated parent node over quarters or other periods. In embodiments, a functional relationship need not be defined when configuring set of placeholder nodes 114. In embodiments, a functional relationship can be defined or updated at various later times.

In 410, set of placeholder nodes 114 can be stored to data store 104 or other storage, as appropriate. In 412, spreading tool 106 and/or other logic can receive user input or other instructions to insert one or more child nodes of one or more corresponding parent node(s) at one or more insertion points represented by one or more placeholder nodes in set of placeholder nodes 114. For example, a set of four child nodes representing annual quarters can be established as lower level nodes of a parent node encoding annual profit for a corporation or other entity. In embodiments, the inserted set of child nodes 116 can each occupy the same hierarchical level in data store 104. It may be noted that in embodiments, there may be a one-to-one relationship between a placeholder node and a child node to be introduced at the insertion point represented by the placeholder node. In embodiments, more than one child node may be inserted at the insertion point represented by the placeholder node. Likewise, in embodiments, two or more child nodes in the set of child nodes 116 can occupy different hierarchical levels in data store 104. In embodiments, the inserted set of child nodes 116 can be associated with more than one parent node. For example, in instances the same set of child nodes 116 can be duplicated as newly inserted nodes linked to two or more parent nodes.

In 414, the set of child nodes 116 identified or configured for insertion can be established and/or built in data store 104, for instance, by storing links to one or more parent nodes along with metadata such as functional relationships with the parent node(s) and/or fellow child nodes. Other configuration data can be specified and/or stored. In 416, spreading tool 106 can access a set of spreading rules 132 to ensure that dependencies are observed, and/or other rules are applied in the generation of set of child nodes 116 and/or the distribution or insertion of data into those nodes. For instance, before storing profit to a child node, for example, for Q2 of year 2010, spreading tool 106 can check set of spreading rules 132 whether another node for charge-offs or other special transactions or modifications applies to that time period. For further instance, spreading tool 106 can check set of spreading rules 132 to determine whether a certain type of data format is required for compatibility with the corresponding parent node, an additional node which will receive output from the child node, or by other nodes or functions of data store 104 or otherwise.

In 418, data from the corresponding parent node(s) can be inserted, distributed, and/or spread to one or more associated child nodes in set of child nodes 116. For instance, data for annual profit can be divided over four quarters and spread or inserted into a set of child nodes 116 representing that set of time periods or other intervals. In 420, data engine 102 can run or perform database operations on data store 104, including set of parent nodes 110 and/or any newly configured or updated set of child nodes 116, for instance, to run reports on that information, merge data between nodes or files, or perform other computations/operations. In 422, spreading tool 106 can store one or more nodes of set of placeholder nodes 114, for instance to data store 104 or other local or remote storage, to store a log of the configuration history of data store 104, data distributions performed in data store 104, or other records of database operations. In embodiments, spreading tool 106 can also or instead delete one or more nodes of set of placeholder nodes 114, for instance, when it is determined that the placeholder node(s) will no longer be needed for spreading or other data operations. In 424, processing can repeat, return to a prior processing point, jump to a further processing point, or end.

Figure 5:
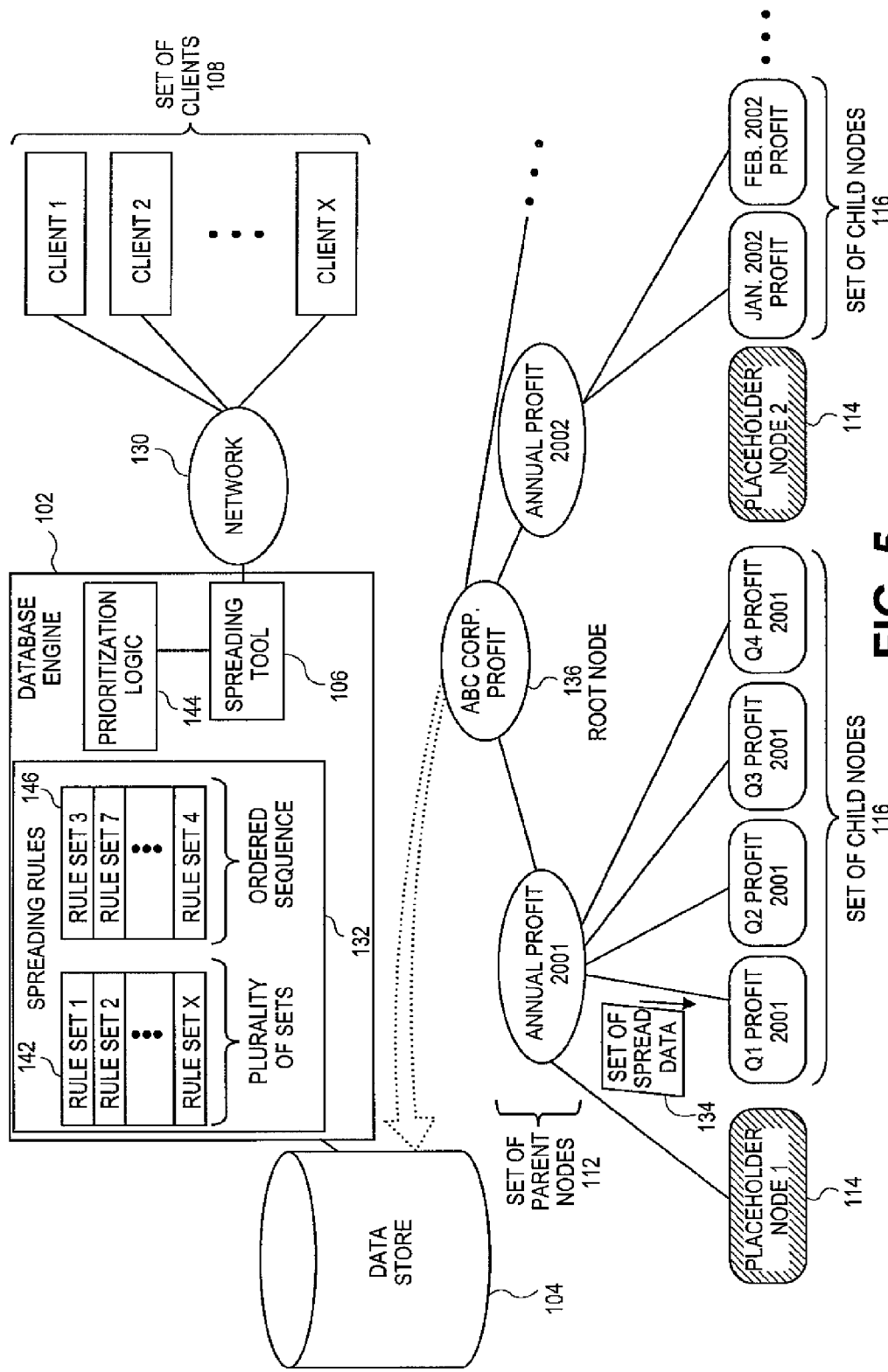
FIG. 5 illustrates an overall system in which systems and methods for generating iterated distributions of data in a hierarchical database can be implemented, according to various embodiments.

In embodiments as for example shown in FIG. 5, spreading tool 106 can access spreading rules 132 to perform multiple passes or iterations of data distributions over set of placeholder nodes 114 and associated sets of child nodes 116. More specifically, as shown in FIG. 5, in embodiments set of spreading rules 132 can comprise a plurality of sets of spreading rules 142. In embodiments, each set of spreading rules in plurality of sets of spreading rules 142 can comprise a set of separately defined and/or independent spreading rules for distribution of data from one or more nodes in set of parent nodes 112 to one or more set of child nodes 116. In embodiments, the rule sets can comprise rule sets that overlap, and/or are associated or dependent on each other. The distribution of data from one or more parent nodes to one or more child nodes in set of child nodes 116 can be performed via set of placeholder nodes 114 as described herein, and/or using other distribution mechanisms.

In embodiments, plurality of sets of spreading rules 142 can be provided by user input, and/or automatically received or accessed by spreading tool 106 from a database or other source. Prioritization logic 144 can likewise be received from user input, and/or accessed automatically from services or data stores. In embodiments, prioritization logic 144 can comprise self-learning networks such as neural networks, fuzzy logic, and/or other networks. In aspects, prioritization logic 144 can for instance perform self-learning operations based on data delivered to or generated by set of child nodes 116 to ensure data consistency, integrity, error-free operation, or to satisfy other criteria.

According to embodiments, spreading tool 106 can access and execute one set of spreading rules selected from plurality of sets of spreading rules 142 after another, to perform desired data distributions or configurations. In aspects, spreading tool 106 can generate an ordering of the sets of spreading rules in plurality of sets of spreading rules 142 using prioritization logic 144. Prioritization logic 144 can comprise rules, thresholds, tests, heuristics, and/or other logic or criteria to place the sets of spreading rules in plurality of sets of spreading rules 142 into a desired order encoded in an ordered sequence of spreading rules 146. For example, prioritization logic 144 can contain a sequence of sets of rules based on dependencies or other interactions between those rules. Prioritization logic 144 can generate ordered sequence of spreading rules 146 based on known or discovered rule set sequences which produce output free of data or software faults, which satisfy desired data integrity or consistency checks, or which are known or discovered to produce other satisfactory functional or operational results.

In embodiments, it may be possible for spreading tool 106 to apply prioritization logic 144 and/or receive user inputs to generate multiple, separate, different, and/or alternative orders or sequences of spreading rules from plurality of sets of spreading rules 142. In aspects, spreading tool 106 can enforce the condition that different sets and/or orders of spreading rules in plurality of sets of spreading rules 142 will be accepted only if those different sets and/or orders produce the same data results in set of child nodes 116 or otherwise, after application of the differing sequences or series of sets of rules. In aspects, different orders or sequences of spreading rules may be validated or finalized under conditions where the differing rule orders may produce different data in set of child nodes 116, and/or in other locations or outputs. In embodiments, prioritization logic 144 can introduce a randomization of the selections of sets of spreading rules, and/or a randomization of the orders in which those sets are applied, for instance, in cases where the selected rule sets are known or verified to produce the same data output or other results.

It may be noted that in aspects, spreading tool 106 can apply prioritization logic 144 to select, access, or import all of the constituent sets of spreading rules in plurality of sets of spreading rules 142. In aspects, spreading tool 106 can also apply prioritization logic 144 to select only a subset of the sets of spreading rules in plurality of sets of spreading rules 142 to perform data distribution from set of parent nodes 112 to set of child nodes 116, and/or other operations. It may be noted that sets of spreading rules from plurality of sets of spreading rules 142 can be applied in successive order, or rule sets can jump or be selected in non-successive orders. In aspects, a rule set can be applied more than one time in a given sequence of iterations, or within one pass. In embodiments, plurality of sets of spreading rules 142 can be extensible or updatable, for instance, to permit a user to input, modify, and/or update the constituent rule sets, and/or update those rule sets via automatic and/or networked services.

Figure 6:
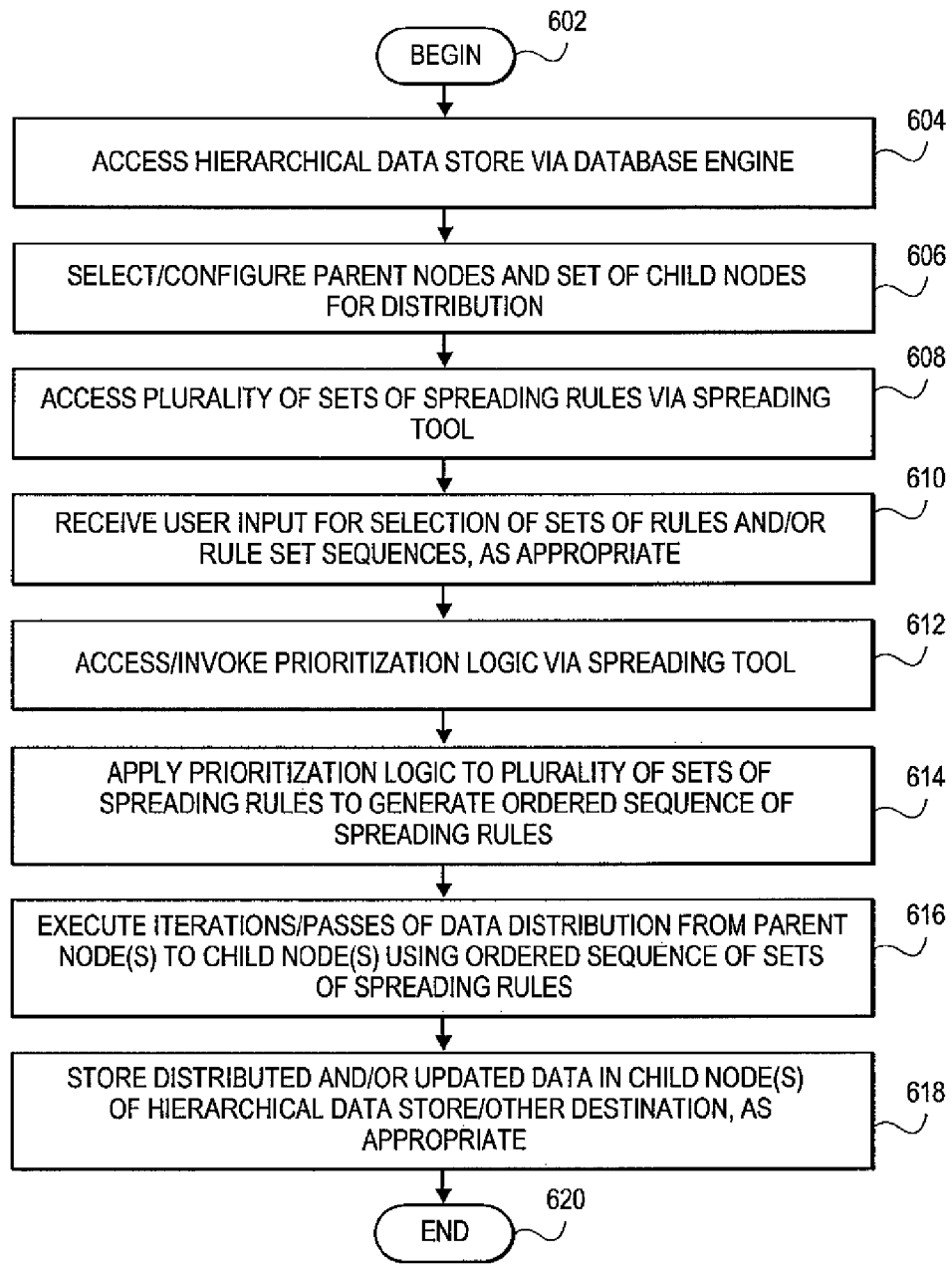
FIG. 6 illustrates overall data aggregation processing to generate distributions of data to lower hierarchical levels in multiple passes or iterations, according to various embodiments.

FIG. 6 illustrates overall processing that can be used in systems and methods of iterative distribution of data in a hierarchical database, according to various embodiments. In 602, processing can begin. In 604, a user can access hierarchical data store 104 via database engine 102 and/or other interfaces or resources. In 606, one or more parent nodes in set of parent nodes 112 and one or more child nodes in set of child nodes 116 can be selected and/or configured for distribution of data from the parent node(s) to the child node(s) using spreading tool 106 and/or other tools or resources. In 608, a user can access plurality of sets of spreading rules 142 via spreading tool 106 and/or other tools or resources.

In 610, spreading tool can receive user input for the selection of sets of spreading rules in plurality of sets of spreading rules 142, and/or rule set orders or sequences for performing iterations of data distribution from the selected parent node(s) to the selected child node(s), as appropriate. In 612, spreading tool 106 can access prioritization logic 144 via spreading tool. In aspects, prioritization logic 144 can comprise logic, decision rules, self-learning networks, heuristics, and/or other resources to perform multi-level data distributions in hierarchical data store 104 or other data objects. In embodiments, spreading tool 106 can combine and/or reconcile user-supplied inputs regarding rule selections, prioritization, and/or other distribution parameters with prioritization criteria and/or rules encoded in prioritization logic 144.

In 614, spreading tool 106 can apply prioritization logic 144 to plurality of sets of spreading rules 142 to generate an ordered sequence of spreading rules 146 to perform a distribution of data from the selected parent node(s) to the selected child node(s). In 616, spreading tool 106 can execute a sequence of iterations and/or passes of data distribution from the selected parent node(s) to the selected child node(s) using the ordered sequence of spreading rules 146, applied to the source data in the selected parent node(s). In 618, spreading tool 106 and/or other logic can stored newly distributed and/or updated data in the selected child node(s) of hierarchical data store 104 and/or other destination, as appropriate. In embodiments, the resulting distributed data can also or instead be transmitted to other data stores, applications, and/or destinations, for instance via networked services. In 620, processing can repeat, return to a prior processing point, jump to a further processing point, or end.

The foregoing description is illustrative, and variations in configuration and implementation may occur to persons skilled in the art. For example, while embodiments have been described in which data store 104 can consist of or contain explicit OLAP and/or XML-based databases, in embodiments, other types or categories of data sources or formats can be included in data store 104.

Similarly, while embodiments have been described in which a single database engine 102 generates and manages data store 104, in embodiments multiple database engines, for example hosted on multiple servers, can cooperate to generate multiple parent/child mappings, placeholder linkages, distributions, sets of spreading rules, and/or other actions to manage and manipulate hierarchical data. Similarly, while embodiments have been described in which data is hosted and managed in one data store 104, in embodiments, multiple data stores can be used. For further example, while embodiments have been described in which database engine 102 supports database operations including data spreading in connection with a set of local or remote clients 108, in networked fashion, in embodiments database engine 102 and/or other machines or resources can be configured to operate on a stand-alone basis. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   receiving an instruction to divide a parent quantity stored as a number in a parent node of a hierarchical database, wherein the parent node is associated with a particular time period;
   accessing multiple sets of spreading rules for dividing the parent quantity from the parent node into multiple child sub-quantities in the hierarchical database corresponding to multiple child nodes of the parent node, wherein each of the child nodes is associated with a portion of the particular time period;
   generating a selection of a subset of the sets of spreading rules and an ordered sequence for executing the selected subset;
   executing, by a processor, the selected subset on the parent quantity according to the ordered sequence to generate the child sub-quantities, wherein each of the child sub-quantities divided from the parent quantity is numerically less than the parent quantity, wherein the selected subset comprises a mathematical division rule that divides the parent quantity into the child sub-quantities, and wherein the selected subset comprises a rule that combines a previous quantity stored as a number in a previous node of the hierarchical database, from a previous time period before the particular time period, with one or more of the child sub-quantities; and
   storing the child sub-quantities as numbers in corresponding ones of the child nodes.

2. The method of claim 1, wherein the instruction to divide the quantity is received from a web browser or a database application.

3. The method of claim 1, wherein executing the selected subset comprises iteratively executing each set of spreading rules in the selected subset.

4. The method of claim 1, wherein the child nodes are derived from a placeholder node associated with the parent node.

5. The method of claim 1, wherein each portion of the particular time period for the child sub-quantities is equal to others of the portions of the particular time period for others of the child sub-quantities.

6. The method of claim 1, wherein a sum of the child sub-quantities is equal to a sum of the parent quantity and the previous quantity.

7. A system comprising:
   a storage to store a hierarchical database;
   a processor, coupled to the storage, to:
     receive an instruction to divide a parent quantity stored as a number in a parent node of the hierarchical database, wherein the parent node is associated with a particular time period;
     access multiple sets of spreading rules for dividing the parent quantity from the parent node into multiple child sub-quantities in the hierarchical database corresponding to multiple child nodes of the parent node, wherein each of the child nodes is associated with a portion of the particular time period;

generate a selection of a subset of the sets of spreading rules and an ordered sequence for execution of the selected subset execute the selected subset on the parent quantity according to the ordered sequence to generate the child sub-quantities, wherein each of the child sub-quantities divided from the parent quantity is numerically less than the parent quantity, wherein the selected subset comprises a mathematical division rule that divides the parent quantity into the child sub-quantities, and wherein the selected subset comprises a rule that combines a previous quantity stored as a number in a previous node of the hierarchical database, from a previous time period before the particular time period, with one or more of the child sub-quantities; and store the child sub-quantities as numbers in corresponding ones of the child nodes.

8. The system of claim 7, wherein the processor is further to generate the ordered sequence automatically based on prioritization logic.

9. The system of claim 7, wherein the child nodes are derived from a placeholder node associated with the parent node.

10. The system of claim 7, wherein each portion of the particular time period for the child sub-quantities is equal to others of the portions of the particular time period for others of the child sub-quantities.

11. The system of claim 7, wherein a sum of the child sub-quantities is equal to a sum of the parent quantity and the previous quantity.

12. A non-transitory computer-readable medium having instructions encoded thereon which, when executed by a processor, cause the processor to perform operations comprising:

receiving an instruction to divide a parent quantity stored as a number in a parent node of a hierarchical database, wherein the parent node is associated with a particular time period;

accessing multiple sets of spreading rules for dividing the parent quantity from the parent node into multiple child sub-quantities in the hierarchical database corresponding to multiple child nodes of the parent node, wherein each of the child nodes is associated with a portion of the particular time period;

generating a selection of a subset of the sets of spreading rules and an ordered sequence for executing the selected subset;

executing, by the processor, the selected subset on the parent quantity according to the ordered sequence to generate the child sub-quantities, wherein each of the child sub-quantities divided from the parent quantity is numerically less than the parent quantity, wherein the selected subset comprises a mathematical division rule that divides the parent quantity into the child sub-quantities, and wherein the selected subset comprises a rule that combines a previous quantity stored as a number in a previous node of the hierarchical database, from a previous time period before the particular time period, with one or more of the child sub-quantities; and storing the child sub-quantities as numbers in corresponding ones of the child nodes.

13. The non-transitory computer-readable medium of claim 12, wherein executing the selected subset comprises iteratively executing each set of spreading rules in the selected subset.

14. The non-transitory computer-readable medium of claim 12, wherein a sum of the child sub-quantities is equal to a sum of the parent quantity and the previous quantity.

15. The non-transitory computer-readable medium of claim 12, wherein each portion of the particular time period for the child sub-quantities is equal to others of the portions of the particular time period for others of the child sub-quantities.

\* \* \* \* \*